United States Patent
Chen et al.

(10) Patent No.: US 11,661,488 B2
(45) Date of Patent: May 30, 2023

(54) ARTICLE COMPRISING A FLAME RETARDANT POLYMERIC FOAM

(75) Inventors: Yong Chen, Shanghai (CN); Kim Walton, Lake Jackson, TX (US); Wei Wang, Yangpu (CN); Takahiko Ohmura, Fujisawa (JP)

(73) Assignee: Dow Global Technologies LLC, Midland, MI (US)

( * ) Notice: Subject to any disclaimer, the term of this patent is extended or adjusted under 35 U.S.C. 154(b) by 1723 days.

(21) Appl. No.: 14/411,438

(22) PCT Filed: Jun. 27, 2012

(86) PCT No.: PCT/CN2012/077608
§ 371 (c)(1),
(2), (4) Date: Jan. 23, 2017

(87) PCT Pub. No.: WO2014/000177
PCT Pub. Date: Jan. 3, 2014

(65) Prior Publication Data
US 2017/0198111 A1    Jul. 13, 2017

(51) Int. Cl.
*C08J 9/10* (2006.01)
*B32B 5/02* (2006.01)
(Continued)

(52) U.S. Cl.
CPC ............... *C08J 9/103* (2013.01); *B32B 5/022* (2013.01); *B32B 5/024* (2013.01); *B32B 5/026* (2013.01);
(Continued)

(58) Field of Classification Search
CPC .......... B32B 2266/025; B32B 2266/08; B32B 2307/3065; B32B 2307/54;
(Continued)

(56) References Cited

U.S. PATENT DOCUMENTS

| 3,847,723 A | 11/1974 | Babayan |
| 5,077,337 A | 12/1991 | Atwell et al. |

(Continued)

FOREIGN PATENT DOCUMENTS

| CN | 1827906 A | 9/2006 |
| CN | 101096421 A | 1/2008 |

(Continued)

OTHER PUBLICATIONS

PCT/CN2012/077608, International Search Report and Written Opinion dated Apr. 4, 2013.

*Primary Examiner* — Camie S Thompson

(57) ABSTRACT

An article comprising a polymeric foam, wherein the polymeric foam contains a continuous polymer matrix defining cells therein, the polymer matrix containing: (a) from 25 to 65 weight percent of one or more olefin block copolymer having a melt index of two grams per ten minutes or more, (b) from 65 to 25 weight percent of one or more chlorinated olefin polymer having a Mooney viscosity less than 60 (ML 1+4, 125° C.), and (c) from 5 to 30 weight parts of antimony trioxide relative to 100 weight parts of polymers in the polymeric foam, with weight percent values relative to total polymer weight in the polymeric foam; a process for preparing the article.

14 Claims, 1 Drawing Sheet

(51) Int. Cl.
    *B32B 5/24*     (2006.01)
    *B32B 5/18*     (2006.01)
    *B32B 27/06*     (2006.01)
    *B32B 27/18*     (2006.01)
    *B32B 27/32*     (2006.01)
    *D06N 3/04*     (2006.01)
    *D06N 3/00*     (2006.01)
    *C08J 9/00*     (2006.01)
    *C08J 9/04*     (2006.01)
    *B32B 5/20*     (2006.01)
    *C08K 3/22*     (2006.01)
    *C09K 21/02*     (2006.01)

(52) U.S. Cl.
    CPC ............... *B32B 5/18* (2013.01); *B32B 5/20* (2013.01); *B32B 5/245* (2013.01); *B32B 27/065* (2013.01); *B32B 27/18* (2013.01); *B32B 27/32* (2013.01); *B32B 27/322* (2013.01); *C08J 9/0061* (2013.01); *C08J 9/0066* (2013.01); *C08J 9/04* (2013.01); *C08K 3/2279* (2013.01); *C09K 21/02* (2013.01); *D06N 3/005* (2013.01); *D06N 3/0063* (2013.01); *D06N 3/0095* (2013.01); *D06N 3/045* (2013.01); *B32B 2266/025* (2013.01); *B32B 2266/08* (2013.01); *B32B 2270/00* (2013.01); *B32B 2307/3065* (2013.01); *B32B 2307/536* (2013.01); *B32B 2307/54* (2013.01); *B32B 2307/5825* (2013.01); *B32B 2307/712* (2013.01); *B32B 2307/718* (2013.01); *B32B 2479/00* (2013.01); *B32B 2605/00* (2013.01); *B32B 2605/003* (2013.01); *C08J 2203/04* (2013.01); *C08J 2323/20* (2013.01); *C08J 2323/28* (2013.01); *C08J 2353/00* (2013.01); *C08J 2423/28* (2013.01); *C08J 2453/00* (2013.01); *D06N 2211/28* (2013.01)

(58) Field of Classification Search
    CPC ...... B32B 2307/5825; B32B 2307/712; B32B 2307/536; B32B 27/065; B32B 27/18; B32B 27/32; B32B 27/322; B32B 5/18; B32B 5/245; B32B 5/20; B32B 5/022; B32B 5/024; B32B 5/026; B32B 2605/00; B32B 2605/003; B32B 2479/00; C08K 3/2279; C08K 3/00; C08K 3/22; C08K 7/14; C08K 5/06; C08K 2003/22; C09K 21/02; C08J 9/0061; C08J 2323/14; C08J 2453/00; C08J 2353/00; C08J 2423/28; C08J 9/103; C08J 9/04; C08J 2203/04; C08J 2203/20; C08J 9/0666; C08J 9/10; C08J 2323/28; C08J 2323/20; Y10T 442/647; D06N 2213/03; D06N 3/045; D06N 3/005; D06N 2211/28; D06N 3/0095; D06N 3/0063; C08L 23/12; C08L 23/286; C08L 23/10; C08L 2201/02; C08L 2201/003; C08L 2205/02; C08L 2666/04
    USPC ............ 521/142, 82; 442/221, 270; 524/409
    See application file for complete search history.

(56) References Cited

U.S. PATENT DOCUMENTS

| | | |
|---|---|---|
| 5,750,600 A | 5/1998 | Nozokido et al. |
| 7,091,139 B2 | 8/2006 | Nobuto et al. |
| 8,829,090 B2 | 9/2014 | Chen et al. |
| 2003/0092846 A1 | 5/2003 | Zhao et al. |
| 2003/0162845 A1 | 8/2003 | O'Reilly et al. |
| 2003/0162854 A1 | 8/2003 | Mayeres et al. |
| 2004/0006164 A1 | 1/2004 | Abu-Isa |
| 2007/0251572 A1 | 11/2007 | Hoya et al. |
| 2008/0051495 A1 | 2/2008 | Murakami et al. |
| 2009/0258182 A1 | 10/2009 | Okamoto et al. |
| 2012/0108134 A1* | 5/2012 | Chee .................. B32B 5/22 442/370 |

FOREIGN PATENT DOCUMENTS

| | | |
|---|---|---|
| CN | 101497721 A | 8/2009 |
| EP | 816422 A1 | 1/1998 |
| EP | 1927466 A1 | 6/2008 |
| JP | S61215053 A | 9/1986 |
| JP | S63287639 A | 11/1988 |
| JP | H07308999 A | 11/1995 |
| JP | H10102381 A | 4/1998 |
| JP | H11172582 A | 6/1999 |
| JP | 2000230068 A | 8/2000 |
| JP | 2000345477 A | 12/2000 |
| JP | 2002272501 A | 9/2002 |
| JP | 2005041913 A | 2/2005 |
| JP | 2005194400 A | 7/2005 |
| KR | 20020000934 A | 1/2002 |
| KR | 20020096511 A | 12/2002 |
| KR | 20080044708 A | 5/2008 |
| WO | 2001092407 A1 | 12/2001 |
| WO | 2001098408 A1 | 12/2001 |
| WO | 2002026879 A1 | 4/2002 |
| WO | 2007073067 A1 | 6/2007 |
| WO | 2011008336 A1 | 1/2011 |
| WO | 2012068727 A1 | 5/2012 |

* cited by examiner

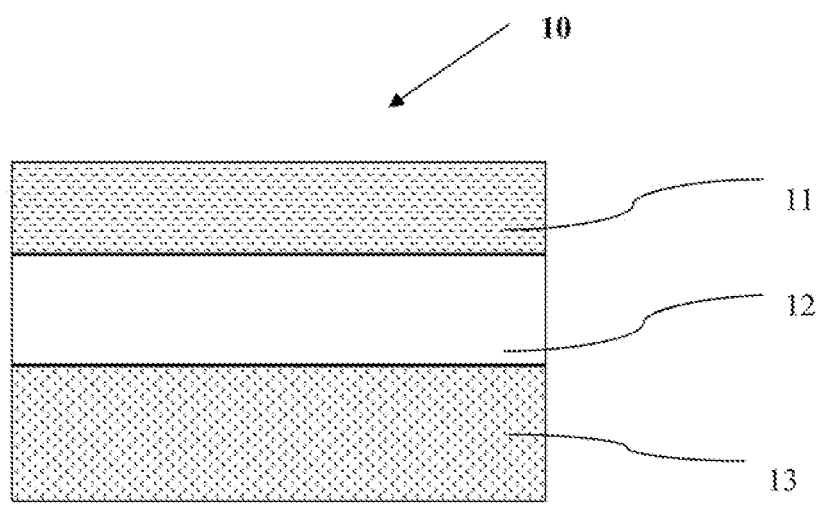

ARTICLE COMPRISING A FLAME RETARDANT POLYMERIC FOAM

FIELD

The present application relates to an article comprising a polymeric foam containing an olefin block copolymer, a chlorinated olefin polymer and antimony trioxide. The article affords good flame retardant performance without compromising foaming property. The article is useful in synthetic leather applications.

BACKGROUND

Synthetic leather is a multi-layer structure generally comprising a bottom fabric layer and a top skin layer and a foam layer sandwiched between the bottom fabric layer and the top skin layer. Widely used polymers for the foam layer include for example polyvinyl chloride (PVC) and conventional polyolefin such as polyethylene (PE) and polypropylene (PP). The conventional polyolefin-based foam layer may offer some advantages over the PVC-based foam, including lightweight, low cost, low density and recyclability, but flexibility, softness and flame retardancy properties (such as self-extinguishing and anti-dripping properties) are not as satisfactory. To achieve comparable flexibility and softness with the PVC-based foam, conventional polyolefin resins typically have to blend with elastomeric material and paraffin oil. But they still have other issues due to inherent characteristics of the conventional polyolefin-based resins, including high melting point, fast cooling on roll processing (due to crystallization), tackiness (the result of the presence of a low molecular weight component), and poor adhesion to polar materials.

It is desirable for synthetic leathers to meet the burn-rate requirement of the FMVSS 302 test as well as certain self-extinguishing and anti-dripping flame retardancy (FR) requirements. The self-extinguishing and anti-dripping requirements are necessary for applications such as furniture and automotive interiors. It is generally more challenging for the polyolefin-based foams to achieve the desirable self-extinguishing and anti-dripping requirement than the PVC-based foams.

Simply adding flame retardant fillers (that is, particulate flame retardant additives) to achieve the burn rate requirement may not be useful in achieving acceptable self-extinguishing and anti-dripping requirements. Moreover, particulate flame retardant additives often have adverse impact on foam and foaming properties. For example, the synthetic leather industry usually requires the foam layer to have at least a certain minimum void volume fraction ($V_f$). $V_f$ is a ratio of void volume in a foam to total volume of the foam. $V_f$ is related to what is commonly measured as the foaming expansion ratio of a foam by the following relationship:

$$\text{Foaming expansion ratio} = (1-V_f)^{-1}$$

The synthetic leather industry typically requires a $V_f$ that corresponds to a foaming expansion ratio of 2.5 or more. While addition of large amount of flame retardant fillers may improve the self-extinguishing and anti-dripping FR performance of a foam, it usually reduces the $V_f$ and foaming expansion ratio of the foam making it more difficult if even possible to achieve the necessary $V_f$.

It would advance the art to provide an article comprising a polyolefin-based foam having desired self-extinguishing and anti-dripping FR performance (that is, desired FR performance) without sacrificing foam property and calendering processability. It would further advance the art to provide a synthetic leather article having the desired FR performance without sacrificing foam property and calendering processability. In addition, it would be advantageous that the article has satisfactory mechanical properties and haptics such as softness and flexibility.

BRIEF SUMMARY

The present invention provides an article comprising a polymeric foam. The polymeric foam comprises a continuous polymer matrix, which comprises a novel combination of an olefin block copolymer, a chlorinated olefin polymer and antimony trioxide in certain ranges. Surprisingly, the article of the present invention shows both acceptable self-extinguishing and anti-dripping FR performance as determined by the testing methods described in the Examples section (below). At the same time, the polymeric foam in the article has a foaming expansion ratio of at least 2.5. In addition, the article has balanced properties of calendaring processability, haptics and mechanical properties.

In a first aspect, the present invention provides an article comprising a polymeric foam, wherein the polymeric foam comprises a continuous polymer matrix defining cells therein, the polymer matrix comprising: (a) from 25 to 65 weight percent of one or more olefin block copolymer having a melt index of two grams per ten minutes or more, (b) from 65 to 25 weight percent of one or more chlorinated olefin polymer having a Mooney viscosity less than 60 (ML 1+4, 125° C.), with weight percent values relative to total polymer weight in the polymeric foam, and (c) from 5 to 30 weight parts of antimony trioxide relative to 100 weight parts of polymers in the polymeric foam.

In a second aspect, the present invention provides a process for preparing the article of the first aspect, comprising the steps of: (1) providing a foamable polymer composition comprising the following components: (a) from 25 to 65 weight percent of one or more olefin block copolymer having a melt index of two grams per ten minutes or more, (b) from 65 to 25 weight percent of one or more chlorinated olefin polymer having a Mooney viscosity less than 60 (MIL 1+4, 125° C.), with weight percent values relative to total polymer weight in the foamable polymer composition, (c) from 5 to 30 weight parts of antimony trioxide relative to 100 weight parts of polymers in the foamable polymer composition, and (d) a blowing agent; (2) melt blending the components in the foamable polymeric composition; (3) expanding the foamable polymeric composition into a polymeric foam.

BRIEF DESCRIPTION OF THE DRAWINGS

FIG. 1 is a schematic illustration of a cross-section of one embodiment of the present invention.

DETAILED DESCRIPTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; FMVSS refers to Federal Motor Vehicle Safety Standard; and ISO refers to International Organization for Standards.

"And/or" means "and, or as an alternative". All ranges include endpoints unless otherwise indicated.

The present invention is an article comprising a polymeric foam that comprises opposing primary surfaces. A "primary surface" is a surface having a planar surface area equal to the largest planar surface area of any surface of an article. Opposing primary surfaces refers to a primary surface of an article and a surface opposing the primary surface, the surface opposing the primary surface generally also being a primary surface. Planar surface area refers to the area of a surface as projected onto a plane so as to neglect surface area contributions due to contour features (for example, peaks and valleys) in the surface.

The polymeric foam comprises a continuous polymer matrix that defines a plurality of cells therein. The polymer matrix is a continuous phase that comprises a plurality of components including an olefin block copolymer, a chlorinated olefin polymer and antimony trioxide.

Olefin block copolymers useful in the present invention include ethylene multi-block copolymers such as those described in the International Publication No. WO2005/090427 and U.S. patent application Ser. No. 11/376,835. Such olefin block copolymer may be an ethylene/α-olefin interpolymer selected from those:

(a) having a molecular weight distribution ($M_w/M_n$) from about 1.7 to about 3.5, at least one melting point ($T_m$) in degrees Celsius (° C.), and a density (d*) in grams/cubic centimeter, wherein the numerical values of $T_m$ and d* have the following relationship:

$$T_m > -2002.9 + 4538.5(d^*) - 2422.2(d^*)^2;\text{ and/or}$$

(b) having a $M_w/M_n$ from about 1.7 to about 3.5, and being characterized by a heat of fusion (ΔH) in Joule per gram (J/g), and a delta quantity (ΔT) in degrees Celsius defined as the temperature difference between the tallest Differential Scanning calorimetry (DSC) peak and the tallest crystallization analysis fractionation (CRYSTAF) peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \leq 48°\text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (c) being characterized by an elastic recovery (Re) in percent at 300 percent strain and one cycle measured with a compression-molded film of the ethylene/alpha-olefin interpolymer, and having a density (d*) in grams/cubic centimeter, wherein the numerical values of Re and d* satisfying the following relationship when the ethylene/alpha-olefin interpolymer being substantially free of a cross-linked phase:

$$Re > 1481 - 1629(d^*); \text{ or}$$

(d) having a molecular fraction which elutes between 40° C. and 130° C. when fractionated using Temperature Rising Elution Fractionation (TREF), characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/alpha-olefin interpolymer; and/or (e) those having a storage modulus at 25° C. (G'(25° C.)), and a storage modulus at 100° C. (G'(100° C.)), wherein the ratio of G'(25° C.) to G'(100° C.) being in the range of about 1:1 to about 9:1.

The olefin block copolymer may also, or alternatively, have one or both of the following characteristics:

a molecular fraction which elutes between 40° C. and 130° C. when fractionated using TREF, characterized in that the fraction having a block index of at least 0.5 and up to about 1 and $M_w/M_n$ greater than about 1.3; and/or (g) an average block index greater than zero and up to about 1.0 and $M_w/M_n$ greater than about 1.3.

The olefin block copolymer in the polymeric foam has a melt index (MI) of at least 2 g/10 min or higher. If the melt index of olefin block copolymers in the foam is lower than 2 g/10 min, the foaming expansion ratio cannot meet the requirement described above. Preferably, the melt index is 4 g/10 min or higher, and more preferably 5 g/10 min or higher. The olefin block copolymer in the foam desirably has a melt index of 10 g/10 min or lower, preferably 8 g/10 min or lower and more preferably 6 g/10 min or lower. Determine MI, according to ASTM D-1238 (at 190° C., 2.16 Kg).

The olefin block copolymer can be present in the polymeric foam at a concentration of 25 weight percent (wt %) or more, 30 wt % or more, 35 wt % or more, or even 40 wt % or more based on total polymer weight in the polymeric foam. At the same time, the concentration of olefin block copolymer can be 65 wt % or less, 60 wt % or less or even 55 wt % or less, based on total polymer weight in the polymeric foam. If the content of the olefin block copolymer in the foam is too high or too low, the polymeric foam cannot achieve a balance of the desired FR performance and foam properties. If the content of the olefin block copolymer in the foam is lower than 25 wt %, the foaming expansion ratio of the polymeric foam is too low to meet the requirement of at least 2.5, the foam will lose flexibility and feel dull. If the content of the olefin block copolymer in the foam is higher than 65 wt %, the polymeric foam cannot achieve the self-extinguishing and anti-dripping performance. Examples of olefin block copolymers useful in the present invention include olefin block copolymers commercially available under the tradename INFUSE™ from The Dow Chemical Company.

The chlorinated olefin polymer is selected from the group consisting of a) chlorinated polyethylene homopolymers and b) chlorinated copolymers prepared from polyolefins that contain copolymerized units of i) ethylene and ii) a copolymerizable monomer. The chlorinated olefin polymer may, optionally, include chlorosulfonyl groups. That is, the polymer chain can have pendant chlorine groups and chlorosulfonyl groups. Such polymers are known as chlorosulfonated olefin polymers.

Representative chlorinated olefin polymers include, for example, a) chlorinated and chlorosulfonated homopolymers of ethylene and b) chlorinated and chlorosulfonated copolymers of ethylene and at least one ethylenically unsaturated monomer selected from the group consisting of $C_3$-$C_{10}$ alpha monoolefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$ carboxylic acids. The term "$C_x$" refers to a molecule having x number of carbon atoms where x is a numeric value. Chlorinated and chlorosulfonated graft copolymers are included as well. Specific examples of suitable polymers include chlorinated polyethylene; chlorosulfonated polyethylene; chlorinated ethylene vinyl acetate copolymers; chlorosulfonated ethylene vinyl acetate copolymers; chlorinated ethylene acrylic acid copolymers; chlorosulfonated ethylene acrylic acid copolymers; chlorinated ethylene methacrylic acid copolymers; chlorosulfonated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; chlorinated copolymers of ethylene with propylene, butene, 3-methyl-1-pentene, or octene and chlorosulfonated copolymers of ethylene with propylene, butene, 3-methyl-1-pentene or octene. The copolymers may be dipolymers, terpolymers, or higher order copolymers. In particular, chlorinated olefin polymers suitable in the present invention include chlorinated polyethylene and chlorinated copolymers of ethylene vinyl acetate. Suitable chlorinated olefin polymers in the present invention include TYRIN™ chlorinated polyethylenes available from The Dow Chemical Company (TYRIN is a trademark of The Dow Chemical Company). Some other examples of chlorinated olefin polymers are described in U.S. Pat. Nos. 4,412,448; 4,767,823; 5,242,987; 5,446,064; 6,204,334; 6,706,815; and International Publication No. WO 2009/002952.

The chlorinated olefin polymers and chlorosulfonated olefin polymers may, for example, be prepared from polyolefin resins that are branched or unbranched. Chlorination or chlorosulfonation of the base resins may take place in suspension, solution, solid state or fluidized bed. Free radical suspension chlorination processes are described and taught in U.S. Pat. Nos. 3,454,544, 4,767,823 and references cited therein. Such processes involve preparation of an aqueous suspension of a finely divided ethylene polymer that is then chlorinated. An example of a free radical solution chlorination process is disclosed in U.S. Pat. No. 4,591,621. The polymers may also be chlorinated in the melt or fluidized beds, for example as taught in U.S. Pat. No. 4,767,823. Chlorosulfonation processes are generally performed in solution but suspension and non-solvent processes are also known. Preparation of chlorosulfonated olefin polymers is described in U.S. Pat. Nos. 2,586,363, 3,296,222, 3,299,014, and 5,242,987.

The Mooney viscosity (ML 1+4, 125° C.) of the chlorinated olefin polymer in the polymeric foam is less than 60 and can be less than 55, less than 50, or even less than 45. The Mooney viscosity herein is measured in accordance with ISO 289 (ML 1+4, 125° C.). If the Mooney viscosity of the chlorinated olefin polymer in the polymeric foam is higher than 60 (ML 1+4, 125° C.), the foaming expansion ratio is less than 2.5. The Mooney viscosity (ML 1+4, 125° C.) of the chlorinated olefin polymer in the polymeric foam may be generally 20 or higher, 30 or higher, or even 40 or higher.

The concentration of chlorinated olefin polymer in the polymeric foam of the present invention may be in an amount of 25 percent by weight or more, 30 percent by weight or more, or even 35 percent by weight or more. At the same time, the amount of the chlorinated olefin polymer in the polymeric foam may be 65 percent by weight or less, 60 percent by weight or less, or even 55 percent by weight or less. Percent by weight of chlorinated olefin polymer is based on total polymer weight in the polymeric foam. If the concentration of the chlorinated olefin polymer in the polymeric foam is higher than 65 percent by weight, the foaming expansion ratio of the polymeric foam will be too low to meet the requirement of the foaming expansion ratio and the foam will lose the flexibility and feel dull. If the content of the chlorinated olefin polymer in the foam is lower than 25 percent by weight, the polymeric foam cannot obtain the self-extinguishing and anti-dripping performance.

The chlorinated olefin polymer useful in the present invention may have a degree of chlorination (that is, chlorine content), that is 15 weight percent or more, 20 weight percent or more, 25 weight percent or more, 30 weight percent or more, or even 35 weight percent or more. The degree of chlorination of the chlorinated olefin polymer is generally 50 weight percent or less, 47 weight percent or less, or even 45 weight percent or less. The degree of chlorination is the weight percent of chlorine relative to total weight of chlorinated olefin polymer.

The antimony trioxide ($Sb_2O_3$) of the present invention exists as particles or agglomerates dispersed throughout the continuous polymer matrix. To achieve the desired FR performance, the concentration of $Sb_2O_3$ in the polymeric foam is 5 or more weight parts, 10 or more weight parts, or even 12 or more weight parts. At the same time, the concentration of $Sb_2O_3$ is desirably 30 weight parts or less, and can be 25 weight parts or less. Weight parts are relative to 100 weight parts of polymer in the polymeric foam. The novel combination of the olefin block copolymer and chlorinated olefin polymer with $Sb_2O_3$, surprisingly provides the polymeric foam with the desired FR performance without compromising foaming property and calendaring property.

The continuous polymer matrix of the polymeric foam of the present invention can further comprise one or any combination of more than one optional additional component, for example, a chlorinated paraffin, an additional polymer, an additive or a filler.

The chlorinated paraffin optionally used in polymeric foam of the present invention typically is made by the chlorination of liquid paraffin fractions and/or paraffin waxes. The chlorinated paraffin may generally have average molecular weight of from about 250 grams per mole to about 1,400 grams per mole. The chlorine content may vary widely and generally from 40 wt % to 75 wt %, from 50 wt % to 75 wt %, or even from 60 wt % to 75 wt %, based on total weight of the chlorinated paraffin. The chlorinated paraffin useful in the present invention can be a liquid chlorinated paraffin (liquid at room temperature) and/or preferably a resinous chlorinated paraffin (solid under ambient conditions). Examples of commercially available chlorinated paraffins useful in the present invention include CHLOREZ™ chlorinated paraffin available from Dover Chemical (CHLOREZ is a trademark of Dover Chemical).

The presence of chlorinated paraffin may further improve FR performance of the polymeric foam. Surprisingly, it was found that when the polymeric foam further comprises a chlorinated paraffin and at least 10 weight parts of $Sb_2O_3$ (relative to 100 weight parts of polymers in the continuous phase), the polymeric foam can pass even the stringent Vertical Burn Test described in the Examples section (below) without sacrificing the foaming expansion ratio, calendaring property, haptic property and mechanical properties. If present, the content of the chlorinated paraffins in the polymeric foam is desirably 5 weight parts or more, or even 10 weight parts or more. At the same time, the content of the chlorinated paraffin in the foam is desirably 40 weight parts or less, 30 weight parts or less, or even 20 weight parts or less. Weight part of the chlorinated paraffin is based on one hundred weight parts of polymers in the polymeric foam.

Examples of suitable additional polymers optionally used in the polymeric foam of the present invention include propylene/alpha-olefin copolymers, homogeneously branched ethylene/alpha-olefin copolymers, random polypropylene copolymers, styrenic block copolymers such as styrene SEBS (S is styrene, E is ethylene and B is butylene) and SEPS (P is propylene) block copolymers, and combination thereof. Preferably, the additional polymer comprises one or more propylene/alpha-olefin copolymer. The amount of the additional polymer optionally used in the invention, if present, is desirably 5 wt % or more, 10 wt % or more, or even 15 wt % or more. At the same time, the amount of the additional polymer in the foam is desirably 40 wt % or less, 30 wt % or less, or even 20 wt % or less. Wt % of the additional polymer in the foam is based on total polymer weight in the polymeric foam.

The propylene/alpha-olefin copolymer optionally used in the polymeric foam is characterized as having substantially isotactic propylene sequences. "Substantially isotactic propylene sequences" means that the sequences have an isotactic triad (mm) measured by $^{13}C$ NMR of greater than 0.85, greater than 0.90, greater than 0.92, or even greater than 0.93. Isotactic triads are well-known in the art and are described in, for example, U.S. Pat. No. 5,504,172, which refer to the isotactic sequence in terms of a triad unit in the copolymer molecular chain determined by $^{13}C$ NMR spectra. The propylene/alpha-olefin copolymer optionally used in the present invention may have a melt flow rate (MFR) in the range of from 0.1 to 25 g per 10 minutes (g/10 min). Measure the MFR in accordance with ASTM D-1238 (at 230° C., 2.16 Kg). The MFR can be 0.5 g/10 min or more, 1.0 g/10 min or more, or even 2.0 g/10 min or more. At the same time, the MFR can be 15 g/10 min or less, 10 g/10 min or less, or even 8 g/10 min or less. The propylene/alpha-olefin copolymer may have a molecular weight distribution (MWD), defined as weight average molecular weight divided by number average molecular weight ($M_w/M_n$) of 3.5 or less and 3.0 or less, at the same time, may have a MWD of 1.8 or higher.

The propylene/alpha-olefin copolymer optionally used in the polymeric foam comprises units derived from propylene and one or more alpha-olefin comonomers. Exemplary comonomers used to manufacture the propylene/alpha-olefin copolymer are $C_2$ and $C_4$ to $C_{10}$ alpha-olefins; for example, $C_2$, $C_4$, $C_6$ and $C_8$ alpha-olefins. The propylene/alpha-olefin copolymer comprises from 1 to 40 weight percent of one or more units derived from one or more alpha-olefin comonomers, from 1 to 35 wt %, from 1 to 30 wt %, from 3 to 27 wt %, from 3 to 20 wt %, even from 3 to 15 wt % units derived from one or more alpha-olefin comonomers. Such propylene/alpha-olefin copolymers are further described in the U.S. Pat. Nos. 6,960,635 and 6,525,157. Such propylene/alpha-olefin copolymers are commercially available from The Dow Chemical Company, under the trade name VERSIFY, or from ExxonMobil Chemical Company, under the trade name VISTAMAXX.

The continuous polymer matrix of the polymeric foam of the present invention can include, or be free from, any one or combination of more than one of the following additives: processing aids, extenders, internal lubricants (for example, polyethylene glycol (PEG), polypropylene glycol (PPG), calcium stearate, zinc stearate, barium stearate and glycerol mono stearate (GMS)), blocking agents, pigments and/or dyes, antioxidants, ultra-violet (UV)-stabilizers and/or absorbers (for example, 2-hydroxy-4-n-octoxybenzo-phenone, 2-hydroxy-4-methoxy-benzophenone, sodium dicyclohexyl sulfosuccinate), stabilizing agents (for example, titanium di(dioctylpyrophosphosate)-oxyacetate, di(dioctylpyrophosphosate) ethylene titanate, isopropyl tricumylphenyl titanate, tetra(2,2-diallyloxymethyl)butyl and di(ditridecyl)phosphio zirconate glycidoxypropyl-trimethoxysilane) and any combination thereof. The additives in the polymeric foam, if present, may be employed in an amount of generally greater than zero, preferably 0.1 or more and more preferably 0.2 or more weight parts. At the same time, the optional additives may be generally one or less, preferably 0.8 or less and more preferably 0.6 or less weight parts. Weight part of the optional additives is relative to 100 weight parts of polymers in the continuous phase.

The continuous polymer matrix of the polymeric foam of the present invention also can include at least one filler dispersed therein or be free of fillers. Examples of suitable fillers include talc, titanium dioxide, magnesium oxide, metal carbonates such as calcium carbonate, metal sulfates such as calcium sulfate, mica, kaolin, wollastonite, carbon black, glass, clay, graphite fibers and combination thereof. If present, the total amount of the optional filler present in the foam typically is greater than zero, more preferably 3 or more, and even more preferably 5 or more, at the same time, is desirably 30 or less, more preferably 20 or less, and even more preferably 10 or less, weight parts based on one hundred weight parts of polymers in the polymeric foam.

The polymeric foam of the present invention is desirably a closed cell foam. The open cell content of the polymeric foam is desirably 30% or less, and preferably 20% or less as determined according to ASTM 6226-05. The cell size of the polymeric foam may be in a range of 50-300 microns, or even 50-200 microns. The polymeric foam desirably has a uniform cell size distribution.

The polymeric foam desirably has a foaming expansion ratio of at least 2.5 or more, 2.6 or more, 2.7 or more, or even 3.0 or more. The foaming expansion ratio is desirably 6.0 or less, 5.0 or less, or even 4.0 or less. Determine foaming expansion ratio for a polymeric foam by dividing the density of the polymeric foam by the density of the polymer matrix of the foam (that is, the density of the composition of the polymer matrix). Calculate the density of the polymer matrix from the density and concentration of the components in the polymer matrix.

One method of preparing the polymeric foam of the present invention may comprise the steps of: (1) providing a foamable polymeric composition comprising the following components: (a) from 25 to 65 weight percent of an olefin block copolymer having a melt index of 2 g/10 min or more, (b) from 65 to 25 weight percent of a chlorinated olefin polymer having a Mooney viscosity less than 60 (ML 1+4, 125° C.), with weight percent values relative to total polymer weight in the polymeric foam; (c) from 5 to 30 weight parts of antimony trioxide relative to 100 weight parts of polymers in the polymeric foam, (d) a blowing agent, and optionally other optional components (for example, chlorinated paraffins, an additional polymer, an additive or a filler); (2) melt blending the above described components; (3) expand the foamable polymeric composition to form the polymeric foam. In process step (2), the components may be melt blended via any conventional method; for example, the above described components may be melt blended via an extruder, for example, a single screw extruder or a twin screw extruder, Banbury mixer, roll mill, at a temperature which is sufficient to inhibit activation of the blowing agent until the foamable polymeric composition exposes to foaming conditions. Expanding (that is, foaming) the foamable polymer composition is generally conducted at a temperature for a certain time period such that the blowing agent is activated sufficient to foam the composition. For example, foaming conditions may generally include for example an oven temperature of 190-220° C. and an oven residence time of 100-180 seconds.

In particular, if the article of the present invention is used for synthetic leather, the process for preparing the polymeric foam may include the steps of: melt blending the above individual components in the foamable polymeric composition with one another under conditions and for a time that produces an at least substantially homogeneous mixture, calendaring or compression molding the mixture using conventional equipment and conditions to form a sheet, and exposing the sheet to foaming conditions to form the polymeric foam. The blowing agent can be also be added during the calendaring process at a temperature and/or pressure that is sufficient to inhibit expansion of the blowing agent until the foamable polymeric composition is exposed to foaming conditions.

Blowing agents (also known as foaming or expansion agents) useful in preparation the polymeric foam may include gaseous materials, volatile liquids, chemical agents and combination thereof which decompose into a gas and other byproducts. Examples of suitable blowing agents in the present invention include nitrogen; carbon dioxide; air; methyl chloride; ethyl chloride; pentane; isopentane; perfluoromethane; chlorotrifluoromethane; dichlorodifluoromethane; trichlorofluoromethane; perfluoroethane; 1-difluoroethane; chloropentafluoroethane; dichlorotetrafluoroethane; trichlorotrifluoroethane; perfluoropropane; chloroheptafluoropropane; dichlorohexafluoropropane; perfluorobutane; chlorononafluorobutane; perfluorocyclobutane; azodicarbonamide (ADCA); azodiisobutyronitrile; benzenesulfonhydrazide; 4,4-oxybenzene sulfonyl-semicarbazide; ptoluene sulfonyl semicarbazide; barium azodicarboxylate; N,N'-dimethyl-N,N'-dinitrosoterephthalamide; trihydrazino triazine and mixtures thereof. Preferably, ADCA is used as the blowing agent in the present invention. The amount of the blowing agent used in preparation of the polymeric foam generally can be one or more weight part, relative to 100 weight parts of polymers in the foamable polymeric composition, 2 or more, or even 3 or more, at the same time, may be generally 10 or less, preferably 8 or less, and more preferably 6 or less, weight parts.

The polymeric foam of the present invention comprises opposing primary surfaces. The article of the present invention can further comprise a top skin layer on a primary surface of the polymeric foam.

The top skin layer useful in the present invention may be any type of top skin layers known in the art, which typically provides protection against UV-radiation, heat and other weathering factors, and it may carry visible functionalities such as print, embossment, color and/or gloss. Preferably, the top skin layer can also provide desired self-extinguishing and anti-dripping performance, or even pass vertical burn test in some embodiments, while still have balanced properties of calendaring processability, mechanical properties and haptic performance.

The top skin layer useful in the present invention can be compositionally the same as the polymeric foam save for the gas and by-products attributable to the foaming process for producing the polymeric foam. The top skin layer can also have a broader scope than the polymeric foam. For example, the top skin layer may comprise: (i) from 5 to 70 weight percent of one or more olefin block copolymer, (ii) from 10 to 80 weight percent of one or more chlorinated olefin polymer, with weight percent values relative to total polymer weight in the top skin layer, and (iii) from 5 to 30 weight parts antimony trioxide relative to 100 weight parts of the polymer in the top skin layer. The top skin layer can further comprise the optionally additional components as described for the polymeric foam, above. The top skin layer may be generally prepared by melt blending the individual components with one another in any conventional mixing apparatus, for example, Banbury kneader or any suitable extruder, under conditions and for a time that produces an at least substantially homogeneous mixture, and then calendering the mixture using conventional equipment and conditions to form a sheet. The sheet may be heat laminated to the polymeric foam using conventional laminating equipment and conditions.

The article of the present invention can comprise a bottom fabric layer on a primary surface of the polymeric foam. If the article comprises both a top skin layer and a bottom fabric layer, the top skin layer and bottom fabric layer are desirably on opposing primary surfaces of the polymeric foam. For example, it is desirable that the top skin layer (also called a barrier layer) contacts one primary surface of the polymeric foam and the bottom fabric layer contacting the opposing primary surface of the polymeric foam, thereby forms the article in a multilayer structure comprising the polymeric foam residing between the top skin layer and the bottom fabric layer.

The bottom fabric layer useful in the present invention may comprise a flexible polymeric material that can be, for example, woven, nonwoven, knitted, plained or spunbond, and it can comprise natural and/or synthetic fiber. Preferably, the fabric layer is a nonwoven, polymeric, spunbond material of a weight of 100-500, a weight of 150-400, or even a weight of 200-350, grams per square meter ($g/m^2$). Fabrics that can be used in the present invention, for example, cotton, silk and various synthetics based on polyolefins (for example, polyethylene or polypropylene), nylon, polyester, polyurethane (for example, a spandex material), and combination thereof. The preferred fabric is prepared from polyester, polyethylene or polypropylene. The fabric can be, or not, subjected to a pre-lamination treatment, for example, corona surface treatment, impregnation, and the polymeric foam is ultimately heat laminated to the fabric.

The article of the present invention can further comprise one or more than one optional additional layers in addition to one or both of the top skin layer and bottom fabric layer. For example, a tie layer comprising an adhesive composition may optionally reside between the bottom fabric layer and the polymeric foam. A primer (for example, a halogenated polyolefin such as chlorinated polypropylene), may be optionally applied to the surface of the top skin layer to form a primer layer, wherein the top skin layer resides between the primer layer and the polymeric foam. A top coating (for example, polyurethane), may be optionally applied to the surface of the primer layer, so that the primer layer resides between the top coating layer and the top skin layer. Generally, the purpose of the primer layer is to increase adhesion strength between the top skin layer and the top coating layer. The purpose of the top coating layer is to provide protection to the top skin layer and overall structure from scratches, mars and abrasion, to provide a surface for text and designs, and to impart an aesthetically pleasing finish.

The polymeric foam of the article of the present invention can be prepared as describe previously, above. Additional layers, such as a top skin layer and/or bottom fabric layer, can be incorporated into the article by a lamination process. Preferably, foaming (that is, expanding the foamable polymeric composition to form the polymeric foam) is generally conducted after the lamination process. That is, the foamable polymeric composition described above is melt blended and formed into a sheet via, for example, calendaring process or extrusion process, and then the sheet is laminated to the top skin and/or bottom fabric layers in any convenient order or even simultaneously via lamination process to form a laminate, then the laminate obtained is exposed to foaming conditions. If the article of the present invention further comprises the optional layers such as the optional primer and top coating layers, these are usually, but not necessarily, applied after the top skin layer, the polymeric foam and the bottom fabric layer are laminated to one another. If present, the optional primer layer may be roll-coated to a primary surface of the top skin layer followed by the coating of the top coating to the primer layer.

Generally the thickness of the top skin layer may be 0.05 to 3 millimeters (mm), 0.08 to 2 mm, or even 0.1 to one mm. The thickness of the foam layer may be generally 0.05 to 3 mm, 0.08 to 2.5 mm, or even 0.1 to 2 mm. The thickness of the bottom fabric layer may be generally 0.5 to 3 mm, 0.08 to 2.5 mm, or even 0.1 to 2 mm. The thickness of the article may be generally 0.15 to 9 mm, preferably 0.24 to 7 mm and more preferably 0.3 to 5 mm. If present, the optional top coating layer may have a thickness in the range of from 0.1 to 100 microns, from one to 50 microns, or even from 3 to 10 microns; the optional primer layer may generally have a thickness in the range of from 0.1 to 100 microns, one to 50 microns, or even 3 to 10 microns.

Specifically desirable embodiments of the present invention include a multilayer structure. With reference to FIG. 1, there is shown a schematic perspective view of one embodiment of an article of the present invention in a multilayer structure 10 comprising top skin layer 11, foam layer (that is, polymeric foam) 12, bottom fabric layer 13 and optionally one or more other layers therebetween. Each layer comprises two opposing primary surfaces. Top skin layer 11 contacts one primary surface of foam layer 12 and bottom fabric layer 13 contacts the opposing primary surface of foam layer 12, so that foam layer 12 resides between top skin layer 11 and bottom fabric layer 13. Bottom fabric layer 13 can be in contact with foam layer 12 directly or optionally through a tie layer. An optional primer layer (not shown) may be applied on one primary surface of top skin layer 11, so that top skin layer 11 resides between the primer layer and foam layer 12. An optional top coating layer (not shown) may be applied on the primer layer, so that the primer layer resides between the top coating layer and top skin layer 13.

EXAMPLES

The following examples serve to further illustrate embodiments of the present invention illustrate embodiments of the present invention. All parts and percentages are by weight unless otherwise indicated.

Horizontal Burn Test

Samples for foam layers and top skin layers were prepared and tested separately. Foamed sheets for foam layers with thickness of around 2 mm were used for the test. Compression molded sheets for top skin layers with thickness of around one mm were tested. Sample preparation and testing conditions follow the FMVSS 302 test with additional requirements on self-extinguishing and anti-dripping performance as described below.

(1) Burn-Rate Requirement

If samples do not burn, nor transmit a flame front across its surface, at a rate of more than 4 inches per minute (inch/min), it meets the burn-rate requirement of the FMVSS 302 standard. Otherwise, it fails the burn-rate requirement.

(2) Self-Extinguishing and Anti-Dripping Requirements

Tests are conducted following the test procedure A-E in FMVSS 302 standard. Then if a sample shows both self-extinguishing and no dripping before the flame progress to a point 1.5 inches from the clamped end of the specimen, it passes the self-extinguishing and anti-dripping requirements. Otherwise, if the specimen either fails to self-extinguish or shows dripping, it fails.

Vertical Burn Test:

Vertical Burn Test was conducted following an industrial method as described below. For foam layers, foamed sheets were cut into specimens (thickness: 2 mm, width: 10 centimeter (cm), length: 20 cm) for the test. For top skin layers, compression molded sheets were cut into specimens (thickness: 1.0 mm, width: 10 cm, length: 20 cm) for the test. The specimens were fixed in a position vertical to flame generated by propane gas. The length of the flame is 1.5 inch. Expose the specimens to the flame for 10 seconds. Turn off gas supply and begin timing. At least three specimens were tested for each sample. If all three specimens stop burning within two seconds and show no dripping, then the sample passes the Vertical Burn Test.

Void Volume Fraction

Void volume fraction of a polymeric foam was estimated as follows, and should be equivalent to a void volume fraction calculated from foam and polymer matrix densities as described above. A compression-molded sheet (or a calendered sheet) was placed into a hot oven at 220° C. for foaming for 3 minutes to obtain a foamed sheet. The thickness of the compression-molded sheet (that is, original thickness or non-expanded thickness) is denoted as $THK_n$. The thickness of the foamed sheet (that is, expanded thickness) is denoted as $THK_f$. The void volume fraction ($V_f$) of the foam is measured as $$V_f = (THK_f - THK_n)/THK_f$$

Foaming expansion ratio is calculated from the void volume fraction, as $(1-V_f)^{-1}$.

Density: Density was measured in accordance with ASTM D-792-08.

Melt Index (MI): MI was measured using ASTM D-1238 at 190° C., 2.16 kg.

Melt Flow Rate (MFR): MFR was measured using ASTM D-1238 at 230° C., 2.16 kg.

Mooney Viscosity: Mooney Viscosity of chlorinated polyethylene was measured in accordance with ISO 289 at 125° C. using Mooney large rotor (ML), ML 1+4.

Shore A hardness: Shore A hardness was measured according to ASTM D-2240 with timing of 10 seconds. Compression molded sheets with thickness around 6 mm were used.

QUVA test: QUVA accelerated weathering test was measured according to ASTM G53 for a time period of 500 hours. Compression molded sheets for top skin layers were used for the test.

Mechanical Properties

Tensile properties were measured according to D1708-06A (microtensile), with a speed of 500 millimeter per minute mm/min. Foamed sheets for foam layers and compression molded sheets for top skin layers were cut into "dog bone shaped" test specimens using a die cutter.

Tear strength was measured according to ASTM D624 (type C) with an extension speed of 500 mm/min. Foamed sheets for foam layers and compression molded sheets for top skin layers were cut into "C shaped" test specimens using die cutter for testing.

Adhesion strength between a top skin layer and a top PU coating layer was conducted in accordance with ASTM D751 at an extension speed of 50 mm/min. Compression molded sheets for top skin layers were firstly coated with a chloro-polypropylene based primer, thus formed a primer layer on the molded sheets. A polyurethane (PU) coating was then coated on the primer layer, so that the primer layer resides between the top skin layer and the PU coating.

VERSIFY™ 3200 copolymer is a propylene-ethylene copolymer available from Dow Chemical, that has a density of 0.876 grams per cubic centimeter (g/cc), a melt flow rate (MFR) of 8 g/10 min at 230° C./2.16 Kg (VERSIFY is a trademark of The Dow Chemical Company).

VERSIFY 3300 copolymer is a propylene-ethylene copolymer available from The Dow Chemical Company, that has a density 0.866 g/cc and MFR of 8 g/10 min at 230° C./2.16 Kg.

VERSIFY 3401 copolymer is a propylene-ethylene copolymer available from The Dow Chemical Company, that has a density 0.865 g/cc and MFR of 8 g/10 min at 230° C./2.16 Kg.

VERSIFY 2300 copolymer is a propylene-ethylene copolymer available from The Dow Chemical Company, that has a density of 0.866 g/cc and MFR of 2 g/10 min at 230° C./2.16 Kg.

VERSIFY 2400 copolymer is a propylene-ethylene copolymer available from The Dow Chemical Company, that has a density of 0.858 g/cc and MFR of 2 g/10 min at 230° C./2.16 Kg.

INFUSE™ 9500 copolymer is an ethylene-octene multiblock copolymer available from The Dow Chemical Company, that has a density of 0.877 g/cc and melt index (MI) 5 g/10 min at 190° C./2.16 Kg (INFUSE is a trademark of The Dow Chemical Company).

INFUSE 9007 copolymer is an ethylene-octene multiblock copolymer available from Dow Chemical, that has a density of 0.866 g/cc and an MI of 0.5 g/10 min at 190° C./2.16 Kg.

CM6240 chlorinated polyethylene is a chlorinated polyethylene (CPE) available from Yaxing Chemistry, China, that has a chlorine content of around 40 wt % and a Mooney viscosity of 51.9 (ML 1+4, 125° C.).

CM422 CPE is a chlorinated polyethylene available from Hangzhou Keli Chemical Co. Ltd., China, that has a chlorine content of around 40 wt % and a Mooney viscosity of 60.1 (ML 1+4, 125° C.).

TYRIN™ 2500 CPE is a chlorinated polyethylene available from The Dow Chemical Company, that has a chlorine content of 25 wt % and a Mooney viscosity of 70.8 (ML 1+4, 125° C.) (TYRIN is a trademark of The Dow Chemical Company).

Antimony trioxide ($Sb_2O_3$) has an average particle size of about 0.55 microns, commercially available from local vendors.

CHLOREZ™ 700 chlorinated paraffin is a chlorinated paraffin that is available from Dover Chemical and that has a chlorine content of around 70 wt % (CHLOREZ is a trademark of Dover Chemical Corporation).

AC1000 is an azodicarbonamide blowing agent available from KUMYANG Chemical.

Styrene-ethylene-butyl-styrene (SEBS) G1645 is available from Kraton with a styrene content of 13 wt %.

Polypropylene (PP) R 370Y is available from SK Chemical, with MFR 18 g/10 min (2.16 Kg).

Titanium dioxide ($TiO_2$) with grade R-103 is available from DuPont.

Light magnesium oxide (MgO) is commercially available from local vendors.

IRGANOX™ 1010 (IRGANOX is a trademark of Ciba Specialty Chemicals) antioxidant is available from BASF (Ciba).

UV627A ultra violet (UV) stabilizer is available from Dover Chemical.

TINUVIN™ 622 light stabilizer is an oligomeric hindered amine light stabilizer available from BASF (TINUVIN is a trademark of Ciba Specialty Chemicals Corporation).

TRIGONOX™ 101-50D-PD Peroxide is available from Akzo Nobel Corporate, with 50 wt % peroxide and 50 wt % silicon dioxide (TRIGONOX is a trademark of Akzo Nobel Chemicals B.V. Corporation).

Crosslinking coagent is triallyl isocyanurate TAIC™ available from Mitsubishi International Corporation (TAIC is a trademark of Nippon Kasei Chemical).

Inventive Examples (IEs) 1-3 and Comparative Examples (CEs) A-G

Ingredients reported in Table 1 are mixed by using a Haake internal mixer (Polylab OS Rheo Drive 7) at 140-150° C. for 5-6 minutes with a rotor speed of 60 rpm to obtain compounds. The compound obtained was either compression molded into 0.7 (±0.1) mm thick sheets, or calendered on a two-roll mill.

(a) The compression molded sheets were put into a hot oven at 220° C. for certain time period to be expanded into foamed sheets with around 2 mm thickness. The foamed sheets were cut into desired size for FR and mechanical tests.

(b) Calendering processability of the compounds was evaluated on a lab-scale two-roll mill at 150-160° C., a roll speed of 6-10 rpm, and nip clearance of 0.3-1.0 mm. A good calendering processability means the compounds should (i) not stick to the rolls at 150-160° C.; (ii) have smooth banking; (iii) be easily released from the roll; and (iv) produce smooth/glossy sheet.

The properties of foams of the inventive examples 1-3 and comparative examples A-G are given in Table 3.

Inventive Examples (IE) 4 and Comparative Example (CE) H-I

Ingredients reported in Table 2 were mixed by using a Haake internal mixer (Polylab OS Rheo Drive 7) at 140-150° C. for 5-6 minutes with a rotor speed of 60 rpm to obtain compounds. The compounds were compression molded into 1.0 (±0.1) mm thick sheets. The sheet obtained was cut into desired size for FR and mechanical tests.

Calendering processability of the compounds was evaluated following the same procedure as described above for the inventive examples 1-3 and comparative examples A-G.

The properties of the inventive example 4 and comparative examples H-I are given in Table 3.

As shown in table 3, foams of inventive examples 1-3 all passes self-extinguishing and anti-dripping tests in addition to the burn rate requirement according to FMVSS 302 test. In particular, the foam of inventive example 1 also passes the Vertical Burn Test. At the same time, foams of inventive examples 1-3 afford a foaming expansion ratio of at least 2.5, which is comparable to the incumbent propylene/alpha-olefin based foam for synthetic leather (comparative example A). All foams of the inventive examples 1-3 have uniform cell size distributions and smooth primary surfaces. Compositions of inventive examples 1-3 all show good calendering property during processing. The foams of inventive examples 1-3 provide comparable mechanical properties as the incumbent propylene/alpha-olefin based foam. In addition, all foams of the inventive examples 1-3 have comparable hand feel as compared to the incumbent propylene/ethylene copolymer-based foam (comparative example A).

The incumbent propylene/ethylene copolymer-based foam of comparative example A passes the burn rate requirement of FMVSS302 test, but fails both the self-extinguishing and anti-dripping tests. Foams of comparative examples B and C comprise chlorinated polyethylene with a Mooney viscosity higher than 60, which show lower foaming expansion ratio than the foams of inventive examples 1-3. The foam of comparative example D containing no $Sb_2O_3$ fails self-extinguishing test. The foam of comparative example E with addition of 77 wt % of chlorinated polyethylene show lower foaming expansion ratio than the foams of inventive examples 1-3. If 77 wt % of olefin block copolymer is added, the foam of comparative example F shows dripping during the horizontal burn test. The foam of comparative example G comprising an olefin block copolymer with a melt index of 0.5 g/10 min provides lower foam ratio than the foams of inventive examples 1-3.

As shown in table 3, the composition of inventive example 4, which is suitable as a top skin layer for a synthetic leather, also shows both self-extinguishing and anti-dripping performance, at the same time, maintaining calendering property, mechanical property, UV resistance, adhesion strength (between the top skin layer and top PU coating layer) and good hand feel. In contrast, the composition of comparative example H (the top layer of the incumbent propylene/alpha-ethylene based-synthetic leather) cannot pass the self-extinguishing and anti-dripping tests. The composition of comparative example I containing no olefin block copolymer can pass the self-extinguishing and anti-dripping tests, but shows undesirably rigid hand feel shown as high shore A hardness of 80.

TABLE 1

| Ingredient | | IE 1 | IE 2 | IE 3 | CE-A | CE-B | CE-C | CE-D | CE-E | CE-F | CE-G |
|---|---|---|---|---|---|---|---|---|---|---|---|
| VERSIFY 2300 | wt % | — | — | — | 20 | — | — | — | — | — | — |
| VERSIFY 2400 | wt % | — | — | — | 30 | — | — | — | — | — | — |
| VERSIFY 3401 | wt % | — | — | — | 30 | — | — | — | — | — | — |
| INFUSE 9500 | wt % | 55 | 55 | 50 | — | 55 | 55 | 55 | 22 | 78 | — |
| INFUSE 9007 | wt % | — | — | — | — | — | — | — | — | — | 55 |
| SEBS G1645 | wt % | — | — | — | 20 | — | — | — | — | — | — |
| CPE-CM6240 | wt % | 45 | 45 | 50 | — | — | — | 45 | 78 | 22 | 45 |
| CPE-CM422 | wt % | — | — | — | — | 45 | — | — | — | — | — |
| CPE-TYRIN 2500 | wt % | — | — | — | — | — | 45 | — | — | — | — |
| CHLOREZ 700 | phr | 11 | 11 | — | — | 11 | 11 | 11 | 11 | 11 | 11 |
| MgO | phr | 3.3 | 3.3 | 3 | — | 3.3 | 3.3 | 3.3 | 3.3 | 3.3 | 3.3 |
| $Sb_2O_3$ | phr | 13.2 | 5.5 | 12 | — | 13.2 | 13.2 | — | 13.2 | 13.2 | 13.2 |
| $TiO_2$ | phr | 5.5 | 5.5 | 5 | — | 5.5 | 5.5 | 5.5 | 5.5 | 5.5 | 5.5 |
| Peroxide | phr | 0.33 | — | — | — | — | — | — | — | — | — |
| Co-agent | phr | 0.33 | — | — | — | — | — | — | — | — | — |
| Talc | phr | — | — | — | 5 | — | — | — | — | — | — |
| ZnSt | phr | — | — | — | 0.4 | — | — | — | — | — | — |
| BaSt | phr | — | — | — | 0.6 | — | — | — | — | — | — |
| AO-1010 | phr | 0.33 | 0.33 | 0.3 | 0.3 | 0.33 | 0.33 | 0.33 | 0.33 | 0.33 | 0.33 |
| UV 627A | phr | — | — | — | — | — | — | — | — | — | — |
| TINUVIN 622 | phr | — | — | — | 0.2 | — | — | — | — | — | — |
| Azodicarbonamide | phr | 4.4 | 4.4 | 4 | 4 | 4.4 | 4.4 | 4.4 | 4.4 | 4.4 | 4.4 |
| Function | | foam layer | foam layer | foam layer | foam layer | foam layer | foam layer | foam layer | foam layer | foam layer | foam layer |

*wt % values to total polymer weight; phr refers to weight parts per hundred weight parts of polymers.

TABLE 2

| Ingredient | | IE 4 | CE-H | CE-I |
|---|---|---|---|---|
| VERSIFY 3200 | wt % | 16.5 | — | 16.5 |
| VERSIFY 3300 | wt % | 16.5 | — | 16.5 |
| VERSIFY 3401 | wt % | — | — | 12 |
| VERSIFY 2300 | wt % | — | 60 | — |
| INFUSE 9500 | wt % | — | — | — |
| INFUSE 9007 | wt % | 12 | — | — |
| PP R370Y | wt % | — | 10 | — |
| SEBS G1645 | wt % | — | 30 | — |
| CPE-CM6240 | wt % | 55 | — | 55 |
| CHLOREZ 700 | phr | 11 | — | 11 |
| MgO | phr | 3.3 | — | 3.3 |
| Sb$_2$O$_3$ | phr | 13.2 | — | 13.2 |
| TiO$_2$ | phr | 5.5 | — | 5.5 |
| Talc | phr | — | 5 | — |
| ZnSt | phr | — | 0.4 | — |
| AO-1010 | phr | 0.33 | 0.3 | 0.33 |
| UV 627A | phr | 0.33 | — | 0.33 |
| TINUVIN 622 | phr | — | 0.2 | — |
| Function | | Top layer | Top layer | Top layer |

*wt % values are relative to total polymer weight; phr refers to weight parts per hundred weight parts of polymers.

TABLE 3

| | IE-1 | IE-2 | IE-3 | CE-A | CE-B | CE-C | CE-D |
|---|---|---|---|---|---|---|---|
| Calendering Processability | good | good | good | good | good | good | good |
| Shore A hardness (10 seconds) | — | — | — | — | — | — | — |
| Tensile stress at Break, megapascal (MPa) | 3.0 | 3.1 | 2.6 | 2.9 | 2.5 | 3.4 | 3.0 |
| Tensile strain at Break, % | 445 | 450 | 467 | 581 | 355 | 445 | 474 |
| Modulus (Secant 100%), MPa | 1.44 | 1.42 | 1.31 | 1.36 | 1.40 | 2.26 | 1.45 |
| Modulus (Secant 300%), MPa | 0.66 | 0.65 | 0.63 | 0.58 | 0.70 | 1.02 | 0.70 |
| Tear strength, kilonewton per meter (KN/m) | 14.2 | 14.7 | 12.7 | 22.9 | 13.1 | 25.9 | 15.0 |
| Adhesion strength, Kgf/3 cm (kilogram force per 3 cm) | — | — | — | — | — | — | — |
| Foaming expansion ratio | 2.5-3.0 | 2.5-3.0 | 2.5-3.0 | 2.5-3.0 | <2.2 | <2.1 | — |
| Horizontal Burn Test Burn Rate (<4 inch/min) | Pass | Pass | Pass | Pass | Pass | Pass | Pass |
| Self-extinguishing | Pass | Pass | Pass | Fail | Pass | Fail | Fail |
| Anti-dripping | Pass | Pass | Pass | Fail | Pass | Pass | Pass |
| Vertical Burn Test | Pass | Fail | Fail | Fail | Pass | Fail | Fail |
| QUVA (500 hours) | — | — | — | — | — | — | — |

| | CE-E | CE-F | CE-G | IE-4 | CE-H | CE-I |
|---|---|---|---|---|---|---|
| Calendering Processability | good | good | good | good | good | good |
| Shore A hardness (10 seconds) | — | — | — | 72 | 73 | 80 |
| Tensile stress at Break, megapascal (MPa) | 2.7 | 2.9 | 3.5 | 12.8 | 15.7 | 11.2 |
| Tensile strain at Break, % | 430 | 586 | 592 | 724 | 921 | 715 |
| Modulus (Secant 100%), MPa | 1.26 | 1.91 | 1.39 | 3.39 | 3.50 | 3.42 |
| Modulus (Secant 300%), MPa | 0.72 | 0.80 | 0.73 | 1.87 | 1.60 | 1.87 |
| Tear strength, kilonewton per meter (KN/m) | 12.6 | 21.3 | 19.0 | 33.0 | 36.2 | 31.0 |
| Adhesion strength, Kgf/3 cm (kilogram force per 3 cm) | — | — | — | >3.0 | >3.0 | >3.0 |
| Foaming expansion ratio | <1.6 | — | <1.6 | — | — | — |
| Horizontal Burn Test Burn Rate (<4 inch/min) | Pass | Pass | Pass | Pass | Pass | Pass |
| Self-extinguishing | Pass | Pass | Pass | Pass | Fail | Pass |
| Anti-dripping | Pass | Fail | Pass | Pass | Fail | Pass |
| Vertical Burn Test | Pass | Fail | Pass | Pass | Fail | Fail |
| QUVA (500 hours) | — | — | — | Pass | Pass | Pass |

The invention claimed is:

1. An article comprising a polymeric foam, wherein the polymeric foam comprises a continuous polymer matrix defining cells therein, the polymer matrix comprising: (a) from 25 to 65 weight percent of one or more olefin block copolymer having a melt index of two grams per ten minutes or more, (b) from 65 to 25 weight percent of one or more chlorinated olefin polymer having a Mooney viscosity less than 60 (ML 1+4, 125° C.), and (c) from 5 to 30 weight parts of antimony trioxide relative to 100 weight parts of polymers in the polymeric foam, with weight percent values relative to total polymer weight in the polymeric foam.

2. The article of claim 1, wherein the olefin block copolymer is ethylene multi-block copolymer.

3. The article of claim 1, wherein the polymeric foam comprises (a) from 40 to 60 weight percent of the olefin block copolymer, (b) from 60 to 40 weight percent of the chlorinated olefin polymer, with weight percent values relative to total polymer weight in the continuous polymer phase, and (c) from 5 to 20 weight parts of antimony trioxide relative to 100 weight parts of polymers in the continuous polymer phase.

4. The article of claim 1, wherein the Mooney viscosity of the chlorinated olefin polymer is less than 55.

5. The article of claim 1, wherein the polymeric foam further comprises one or more chlorinated paraffin.

6. The article of claim 1, wherein the polymeric foam comprises at least 10 weight parts of antimony trioxide.

7. The article of claim 1, wherein the polymeric foam has a foaming expansion ratio of at least 2.5.

8. The article of claim 1 further comprising a top skin layer and a bottom fabric layer, wherein the polymeric foam resides between the top skin layer and the bottom fabric layer.

9. The article of claim 8, wherein the top skin layer comprises: (i) from 5 to 70 weight percent of one or more olefin block copolymer, (ii) from 10 to 80 weight percent of one or more chlorinated olefin polymer, with weight percent values relative to total polymer weight in the top skin layer, and (iii) from 5 to 30 weight parts of antimony trioxide relative to 100 weight parts of polymers in the top skin layer.

10. The article of claim 9, wherein at least one of the top skin layer and foam further comprises one or more propylene/alpha-olefin copolymer.

11. The article of claim 9, wherein the top skin layer further comprises one or more chlorinated paraffin.

12. The article of claim 9, wherein the top skin layer comprises at least 10 weight parts of antimony trioxide.

13. A process for preparing the article of claim 1, comprising the steps of: (1) providing a foamable polymer composition comprising the following components: (a) from 25 to 65 weight percent of one or more olefin block copolymer having a melt index of two grams per ten minutes or more, (b) from 65 to 25 weight percent of one or more chlorinated olefin polymer having a mooney viscosity less than 60 (ML 1+4, 125° C.), with weight percent values relative to total polymer weight in the foamable polymer composition, (c) from 5 to 30 weight parts of antimony trioxide relative to 100 weight parts of polymers in the foamable polymer composition, and (d) a blowing agent; (2) melt blending the components in the foamable polymeric composition; (3) expanding the foamable polymeric composition into a polymeric foam.

14. The process of claim 13, wherein the components in the foamable polymeric composition is melt blended by calendaring process to form a sheet, and the sheet is laminated to a top skin layer and/or a bottom fabric layer before expanding the foamable polymeric composition into the polymeric foam, wherein the polymeric foam resides between the top skin layer and the bottom fabric layer.

* * * * *